(12) United States Patent
Roos et al.

(10) Patent No.: US 9,083,430 B2
(45) Date of Patent: Jul. 14, 2015

(54) METHOD AND APPARATUS FOR BEAM SELECTION FOR A MULTIBEAM SATELLITE COMMUNICATIONS SYSTEM

(75) Inventors: Dave Roos, Boyds, MD (US); Giadira Vanessa Leon, Damascus, MD (US)

(73) Assignee: Hughes Network Systems, LLC, Germantown, MD (US)

(*) Notice: Subject to any disclaimer, the term of this patent is extended or adjusted under 35 U.S.C. 154(b) by 909 days.

(21) Appl. No.: 13/284,117

(22) Filed: Oct. 28, 2011

(65) Prior Publication Data

US 2013/0109376 A1    May 2, 2013

(51) Int. Cl.
*H04B 7/185*  (2006.01)
*H04B 7/204*  (2006.01)

(52) U.S. Cl.
CPC .......... *H04B 7/2041* (2013.01); *H04B 7/18528* (2013.01)

(58) Field of Classification Search
CPC .. H04B 7/185; H04B 7/18508; H04B 7/1851; H04B 7/18528; H04B 7/204; H04B 7/2041
USPC ......... 455/12.1–13.4, 427–430; 370/316–326
See application file for complete search history.

(56) References Cited

U.S. PATENT DOCUMENTS

2002/0032003 A1* 3/2002 Avitzour et al. ............. 455/12.1

\* cited by examiner

*Primary Examiner* — Raymond Dean
(74) *Attorney, Agent, or Firm* — K&L Gates LLP

(57) ABSTRACT

An apparatus for beam selection for a multibeam satellite communications system including a very small aperture terminal (VSAT) with a remote satellite dish for sending and receiving RF signals and processor for calculating a normalized distance metric for user spot beams, selecting the user spot beam with the lowest normalized distance metric, and finding an outroute on the selected user spot beam using the remote satellite dish.

24 Claims, 6 Drawing Sheets

METHOD AND APPARATUS FOR BEAM SELECTION FOR A MULTIBEAM SATELLITE COMMUNICATIONS SYSTEM

BACKGROUND

In a multibeam satellite communications system, each Very Small Aperture Terminal (VSAT) may need to be told, or may otherwise figure out, which of several available satellite spot beams the VSAT should use to establish connectivity to the satellite communications system. VSATs may be assigned to spot beams based on their geographic position. If a VSAT's location, when plotted on a map, lies within a particular contour of a spot beam, the VSAT may be assigned to that spot beam. In mobile satellite systems such as the THURAYA system, spot beam selection has been based on a VSAT's measurement of signal strength in nearby spot beams, as the VSAT attempts to find the "best" spot beam. The process a VSAT uses to find a spot beam may not be automated, and may be complex.

BRIEF SUMMARY

It is an object of the present invention to provide a method and apparatus for beam selection for a multibeam satellite communications system.

In accordance with an aspect of the present invention, an apparatus for beam selection for a multibeam satellite communications system includes a VSAT with a remote satellite dish for sending and receiving RF signals and processor for calculating a normalized distance metric for user spot beams, selecting the user spot beam with the lowest normalized distance metric, and finding an outroute on the selected user spot beam using the remote satellite dish.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
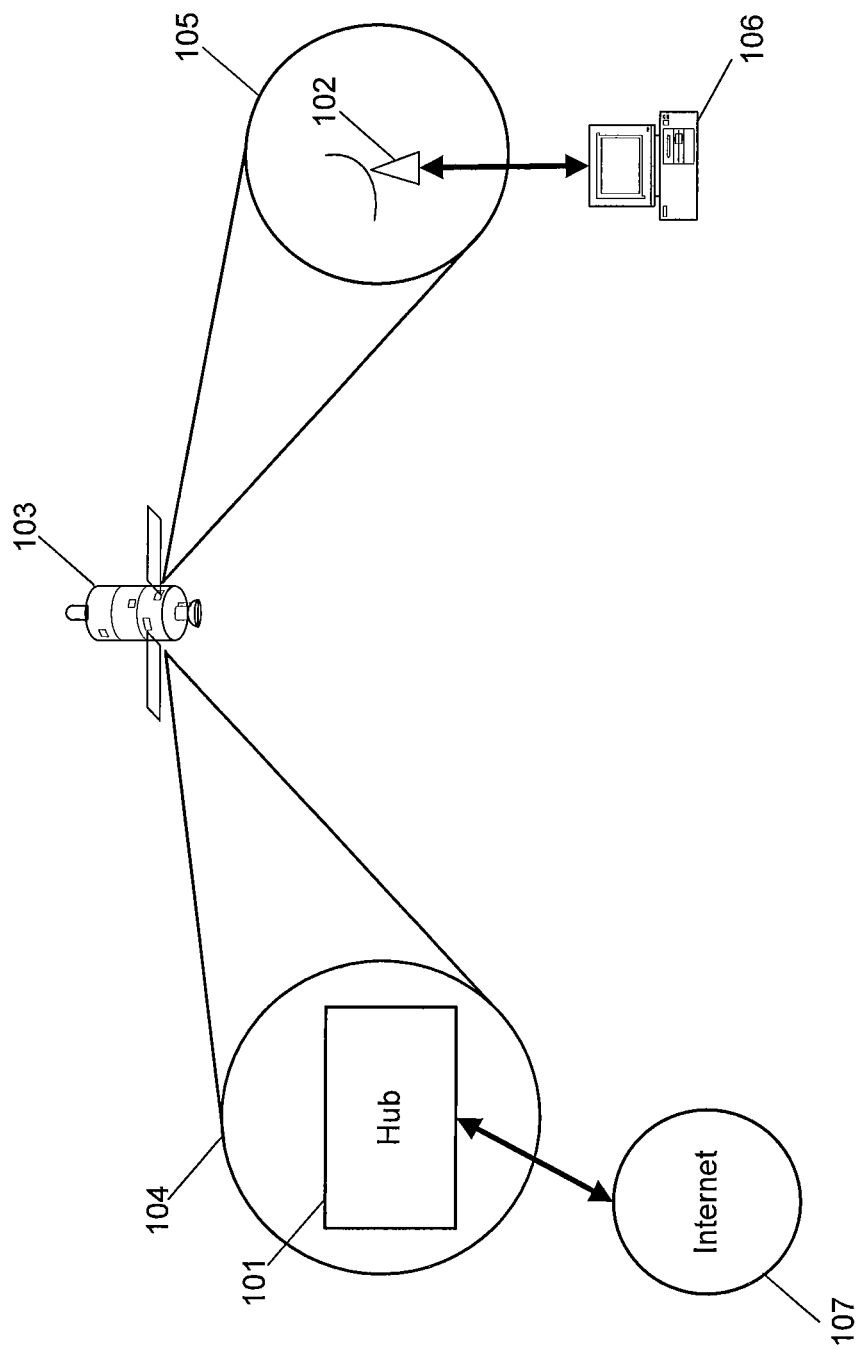
FIG. 1 depicts an exemplary satellite communications system.

FIG. 1 depicts an exemplary satellite communications system. The satellite communications systems may include a hub (gateway, or satellite ground station) 101, a Very Small Aperture Terminal (VSAT) 102, a satellite 103, a gateway spot beam 104, a user spot beam 105, a remote host 106, and the Internet 107, The hub 101 may be a satellite ground station, hub or gateway for a satellite communications system, and may be connected to the VSAT 102 through the satellite 103. Feeder links through the gateway spot beam 104 may carry data between the hub 101 and the satellite 103, and may include a forward uplink for transmitting data from the hub 101 to the satellite 103, and a return downlink for transmitting data from the satellite 103 to the hub 101. The hub 101 may be a high capacity, large antenna earth station with connectivity to ground telecommunications infrastructure, such as, for example, the Internet 107.

The VSAT 102 may be used by end users to access the satellite communications system. The VSAT 102 may include a remote satellite dish for receiving RF signals from and transmitting RF signals to the satellite 103, a satellite modem and other equipment for managing the sending and receiving of data, and one or more remote hosts 106, which may be computer systems or other electronic devices capable of network communications at a site remote from the hub 101. For example, the VSAT 102 may be used at a residence or place of business to provide access to the Internet 107. User broadband links through the user spot beam 105 may carry data between the satellite 103 and the VSAT 102 and may include a return uplink for transmitting data from the VSAT 102 to the satellite 103, and a forward downlink for transmitting data from the satellite 103 to the VSAT 102. The user broadband links may enable the provision of broadband service to the VSAT 102.

The satellite 103 may be any suitable communications satellite for connecting a gateway, such as, for example, the hub 101, to a VSAT, such as, for example, the VSAT 102. The satellite 103 may use small spot beams, such as the user spot beam 105, to optimize capacity and availability for user terminal and gateway access, with uplink and downlink frequencies reused between spot beams in a pattern to maximize capacity and coverage while minimizing co-frequency interference. The user spot beam 105 may have a coverage area, which may by the geographic region in which the VSAT 102 may be located and be able to connect to the satellite 103 through the user spot beam 105. If the VSAT 102 is within the coverage area of the user spot beam 105, the VSAT 102 may be within the user spot beam 105. Otherwise the VSAT 102 may be said to be outside the user spot beam 105. Gateway coverage may be provided by gateway spot beams, such as, for example, the gateway spot beam 104. The hub 101 may be located within the gateway spot beam 104. The satellite 103 may provide VSAT coverage in two or more user spot beams. The VSAT 102 may be covered by the user spot beam 105.

The satellite 103 may provide bent-pipe connectivity between user spot beams, such as the user spot beam 105, and the gateway spot beam 104. A given uplink frequency band from a given user spot beam may be translated into a given downlink frequency band of a given gateway spot beam, and similarly, a given uplink frequency band from a given gateway spot beam may be translated into a given downlink frequency band of a given user spot beam. The satellite 103 may alternatively be part of a unidirectional satellite communications system.

The satellite 103 may use spot beams and frequency and polarization reuse to maximize the total capacity of the system. Signals passing through the satellite 103 in the forward direction, towards the VSATs, may be based on the DVB S.2 standard (ETSI EN 302 307) using signal constellations up to and including at least 16-APSK. The signals intended to pass through the satellite 103 in the return direction, toward the hubs, may be based on the IPoS standard (ETSI TS 102 354). Other suitable signal types may also be used in either direction, including, for example higher data rate variations of DVB S.2.

The hub 101 may be connected to the Internet 107. The remote hosts 106 connected to VSAT 102 may connect to the Internet 107 through the satellite 103 and the hub 101. Data sent from the VSAT 102 to the Internet 107 may be transmitted to the satellite 103, then from the satellite 103 to the hub 101. The hub 101 may then transmit the data to the Internet 107. Data from the Internet 107 may be sent to the VSAT 102 by being transmitted to the hub 101, then to the satellite 103, and then to the VSAT 102.

The satellite communications system may also include, for example, gateway terrestrial network connectivity to a PSTN, private networks or other networks, along with connectivity to the Internet 107, service and network management systems, user equipment, interconnect infrastructure, and other infrastructure and components suitable for a satellite communications system.

Figure 2:
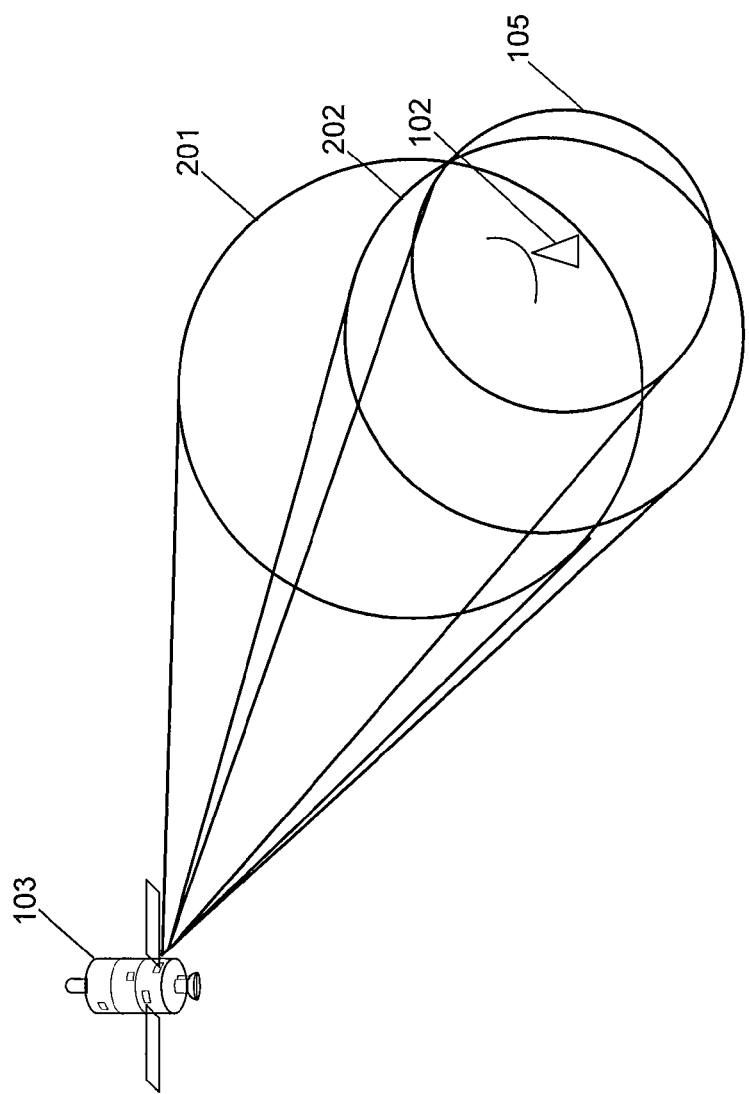
FIG. 2 depicts an exemplary multibeam satellite communications system where a VSAT is located within multiple spot beams.

FIG. 2 depicts an exemplary multibeam satellite communications system where a VSAT is located within multiple spot beams. The satellite 103 may have number of user spot beams in addition to the user spot beam 105, such as, for example, the user spot beam 201 and the user spot beam 202. Each of the user spot beams 105, 201 and 202 may have a possibly unique radius, outside of which the user spot beam may be visible to the VSAT 102, but may not considered usable. The user spot beams 105, 201, and 202 may provide overlapping coverage in some areas, and the VSAT 102 may need to determine which of the user spot beams 105, 201, or 202 to use to connect to the satellite 103.

The VSAT 102 may use its own location, the locations, sizes, and shapes of the available user spot beams, and parameters set by the operator of the satellite communications system to determine which of the available user spot beams the VSAT 102 should use. For example, the VSAT 102 may compare its own location, in latitude and longitude, to the known coverage area of the available user spot beams, to determine which of the user spot beams the VSAT 102 is located within. The performance of user spot beam for the VSAT 102 may be inversely proportional to the square of the VSAT 102's distance from the center of the user spot beam, so the VSAT 102 calculate its distance from the center of the available user spot beams to determine which user spot beam may provide the VSAT 102 with the best connection. The operator of the satellite communications system may also assign weights to the user spot beams, which may cause the VSAT 102 to be more likely to select one user spot beam over another, for example, as part of a load balancing scheme.

The VSAT 102 may use its distance from the center of a user spot beam i and a weight assigned to that user spot beam to calculate a normalized distance metric $D_i$ for the user spot beam. The normalized distance metric $D_i$ may be calculated according to equation:

$$D_i = \left( \frac{\sqrt{(x-x_i)^2 + (y-y_i)^2}}{R_i} \right)^{W_i} \quad (1)$$

where (x, y) may give the location of the VSAT 102 in horizontal (az/el) or U/V coordinates, $(x_i, y_i)$ may give the location of the center of the user spot beam i in az/el or U/V coordinates, $R_i$ may be the radius of the user spot beam i, and $W_i$ is the weight given to the user spot beam i, for example, by the operator. $W_i$ may be set to 2 by default if no other weight has been assigned to the user spot beam i. The smaller the $D_i$ is for a given user spot beam, the more likely the VSAT 102 may be to use that user spot beam.

Figure 3:
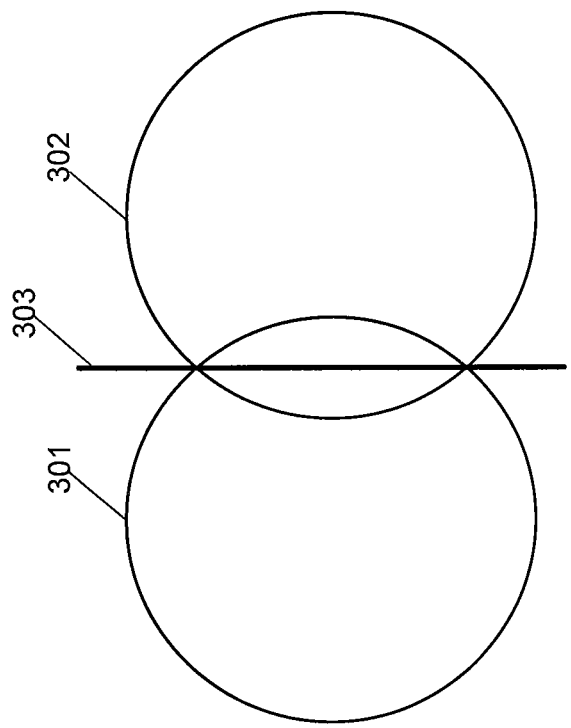
FIG. 3 depicts an exemplary plot of a two user spot beams with equal beam sizes.

FIG. 3 depicts an exemplary plot of a two user spot beams with equal beam sizes. A user spot beam 301 and a user spot beam 302 may be user spot beams of equal size originating from the satellite 103. A locus of points for which the metric $D_i$ from the centers of the user spot beams 301 and 302 is equal may be termed an "equimetric" line 303. The equimetric line 303 may represent possible locations of the VSAT 102 with respect to the user spot beam 301 and the user spot beam 302 for which the $D_i$ metric is equal and hence for which the user spot beam 301 and 302 may be equivalent choices for the VSAT. The line 303 may be the locus of locations for the VSAT 102 where the VSAT 102 would calculate equal $D_i$'s for the user spot beam 301 and the user spot beam 302 if the user spot beams 301 and 302 are given equal weight. The equimetric line 303 may indicate that if the VSAT 102 is located to the left of the equimetric line 303 and within the user spot beam 301, the VSAT 102 should use the user spot beam 301, and if the VSAT 102 is located to the right of the equimetric line 303 and within the user spot beam 302, the VSAT 102 should use the user spot beam 302.

Figure 4:
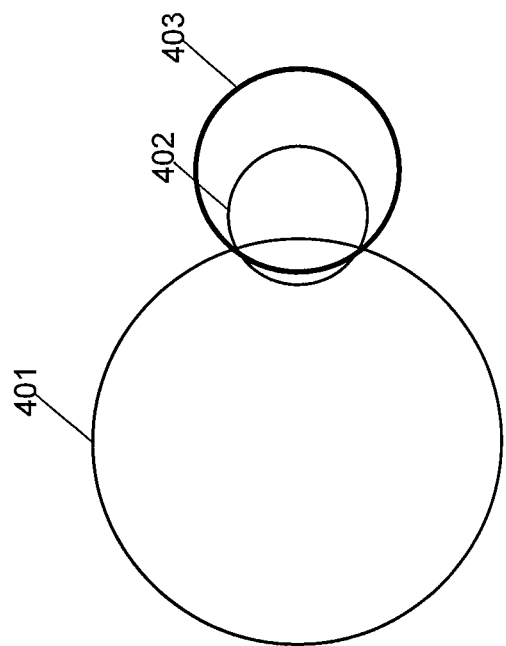
FIG. 4 depicts an exemplary plot of two user spot beams with unequal beam sizes.

FIG. 4 depicts an exemplary plot of two user spot beams with unequal beam sizes. A user spot beam 401 and a user spot beam 402 may be user spot beams of different size originating from the satellite 103. An equimetric line 403 may be the locus of locations for the VSAT 102 where the VSAT 102 would calculate equal $D_i$'s for the user spot beam 401 and the user spot beam 402 if the user spot beams 401 and 402 are given equal weight. The equimetric line 403 may indicate that if the VSAT 102 is located outside of the equimetric line 403 and within the user spot beam 401, the VSAT 102 should use the user spot beam 401, and if the VSAT 102 is located inside the equimetric line 403 and within the user spot beam 402, the VSAT 102 should use the user spot beam 402. The VSAT 102 may use the user spot beam 402 from more locations in the overlap area between the user spot beam 401 and the user spot beam 402, as the $D_i$ for the user spot beam 402 may be lower in most locations in the overlap area due to the smaller size of the user spot beam 402.

Figure 5:
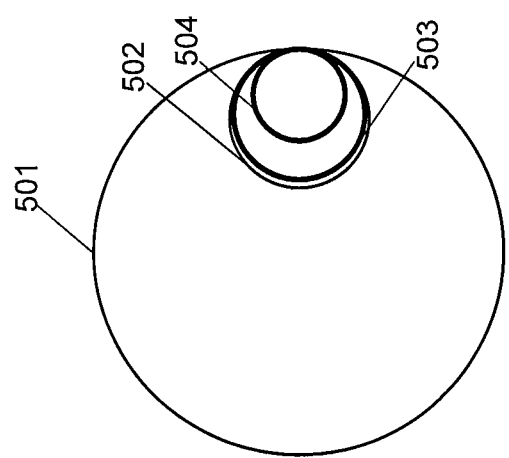
FIG. 5 depicts an exemplary plot of two user spot beams with unequal beam sizes and overlapping coverage.

FIG. 5 depicts an exemplary plot of two user spot beams with unequal beam sizes and overlapping coverage. A user spot beam 501 and a user spot beam 502 may be user spot beams of different size originating from the satellite 103, with the coverage area of the user spot beam 502 contained within the coverage area of the user spot beam 501. An equimetric line 503 may be the locus of locations for the VSAT 102 where the VSAT 102 would calculate equal $D_i$'s for the user spot beam 501 and the user spot beam 502 if the user spot beam 501 is given a weight of 2 and the user spot beam 502 is given a weight of 8. The unequal weights may indicate that the operator of the satellite communications systems would prefer that VSATs, such as the VSAT 102, use the user spot beam 502. An equimetric line 504 may be calculated using equal weights. The equimetric line 503 may indicate that if the VSAT 102 is located outside of the equimetric line 503 and within the user spot beam 501, the VSAT 102 should use the user spot beam 501, and if the VSAT 102 is located inside the equimetric line 503 and within the user spot beam 502, the VSAT 102 should use the user spot beam 502. The same may apply to the equimetric line 504. Because the weight of the user spot beam 502 is higher for the calculation for the equimetric line 503, the VSAT 102 may use the user spot beam 502 from more locations within the user spot beam 502 as compared to when the weights for the user spot beams 501 and 502 are equal, as in the calculation of the equimetric line 504. With equal weights, there will be fewer locations within the user spot beam 502 from which the VSAT 102 would use the user spot beam 502 instead of the user spot beam 501.

Figure 6:
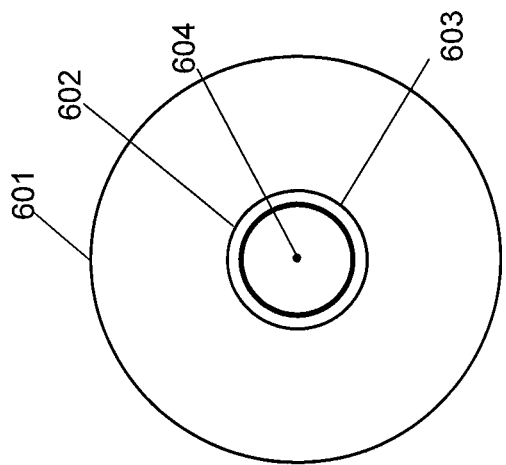
FIG. 6 depicts an exemplary plot of two user spot beams with unequal beam sizes and concentric coverage.

FIG. 6 depicts an exemplary plot of two user spot beams with unequal beam sizes and concentric coverage. A user spot beam 601 and a user spot beam 602 may be user spot beams of different size originating from the satellite 103, with the coverage area of the user spot beam 602 contained within the coverage area of the user spot beam 601, and both of the user spot beams 601 and 602 having the same center. An equimetric line 603 may be the locus of locations for the VSAT 102 where the VSAT 102 would calculate equal $D_i$'s for the user spot beam 601 and the user spot beam 602 if the user spot beam 601 is given a weight of 2 and the user spot beam 602 is given a weight of 8. An equimetric line 604 may be calculated using equal weights. The equimetric line 603 may indicate that if the VSAT 102 is located outside of the equimetric line 603 and within the user spot beam 601, the VSAT 102 should use the user spot beam 601, and if the VSAT 102 is located inside the equimetric line 603 then the VSAT 102 should use the user spot beam 602. The equimetric line 504 may be a point at the shared center of the user spot beam 601 and the user spot beam 602, because with equal weights, the $D_i$ for the user spot beam 601 may always be less than the $D_i$ for the user spot beam 602 for any location of the VSAT 102 due to the greater radius of the user spot beam 601. Thus, with equal weights, the VSAT 102 may always use the user spot beam 601 so long as the VSAT 102 is located within the user spot beam 601, unless the VSAT 102 is at the center of the user spot beam 601, in which case either of the user spot beams 601 and 602 may be used. Because the weight of the user spot beam 602 is higher for the calculation for the equimetric line 603, the VSAT 102 may use the user spot beam 602 from more locations within the user spot beam 602 as compared to when the weights for the user spot beams 601 and 602 are equal. With concentric user spot beams, weighting may be used to ensure proper load balancing between the concentric user spot beams.

Figure 7:
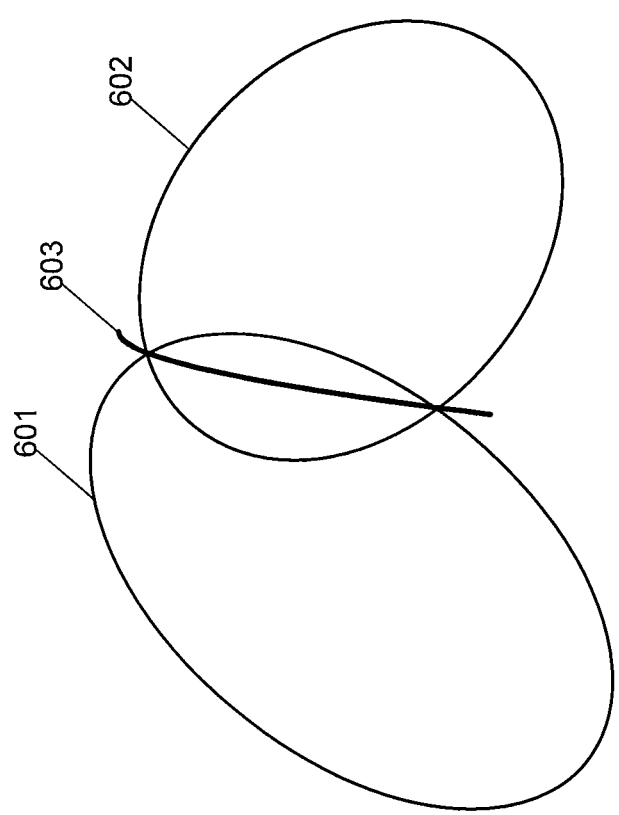
FIG. 7 depicts an exemplary plot of two user spot beams with elliptical beam shapes.

FIG. 7 depicts an exemplary plot of two user spot beams with elliptical beam shapes. All user spot beams may not have coverage areas with circular shapes. Some user spot beams may be, for example, elliptical. A user spot beam 701 and a user spot beam 702 may be user spot beams of different size originating from the satellite 103, and with elliptical shapes. Because the user spot beams 701 and 702 are elliptical, the radius $R_i$ used for calculating $D_i$ may no longer be a constant, but may instead be a function of the angle between the centroid of the elliptical shape of the user spot beam 701 or 702 and the location of the VSAT 102. $R_i$ may be calculated based on the angle $\theta_i$ of the line from the centroid to the location of the VSAT 102. The angle $\theta_i$ may be calculated according to the equation:

$$\theta_i = \arctan((y-y_{0i})/(x-x_{0i})) \quad (2)$$

where (x,y) may give the location of the VSAT 102 as in equation (1), and $(x_{0i}, y_{0i})$ may give the location of the centroid of the user spot beam. $\theta_i$ may then be used to calculate the value of $R_i$ for the given location of the VSAT 102 according to the equation:

$$R_i = \sqrt{\left(\begin{array}{l}(R_{1i}*\cos(\theta_i - a_i)*\cos(a_i) - R_{2i}*\sin(\theta_i - a_i)*\sin(a_i)^2 + \\ (R_{2i}*\sin(\theta_i - a_i)*\cos(a_i) + R_{1i}*\cos(\theta_i - a_i)*\cos(a_i))\end{array}\right)^2} \quad (3)$$

where $R_{1i}$ may be the semi-major axis, $R_{2i}$ may be the semi-minor axis, and $a_i$ may be the tilt angle, or the angle of the ellipse with respect to the X-axis. Using equation (3) for $R_i$ in conjunction with equation (1), $D_i$ values may calculated for the various possible locations of the VSAT 102, resulting in an equimetric line 703. If the VSAT 102 is to the left of the equimetric line 703 and inside the user spot beam 701, the VSAT 102 may use the user spot beam 701, and if the VSAT 102 is to the right of the equimetric line 703 and inside the user spot beam 702, the VSAT may use the use spot beam 702.

Figure 8:
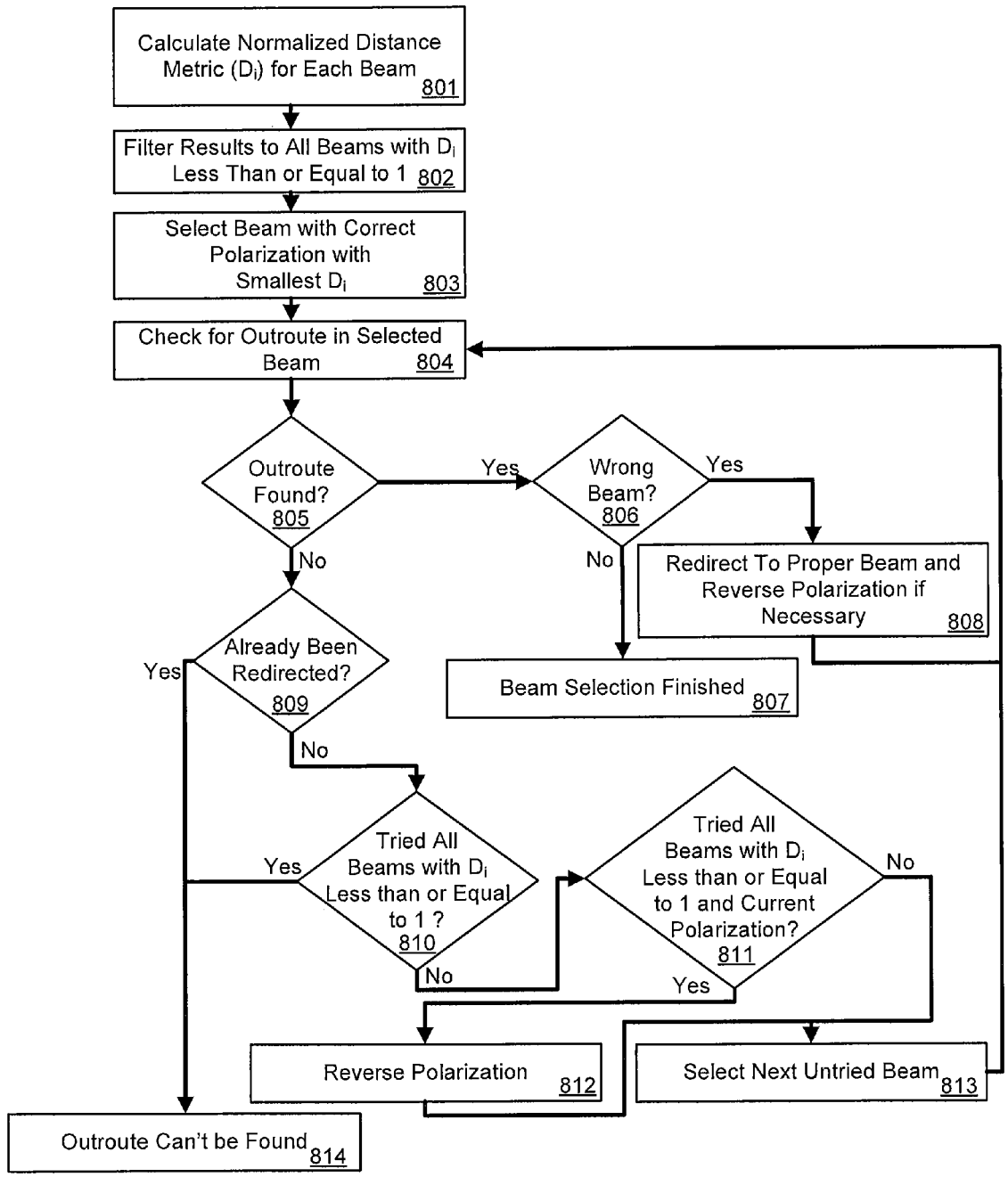
FIG. 8 depicts an exemplary procedure for performing user spot beam selection in a multibeam satellite communications system.

The calculation of an equimetric line May be useful in determining locations for possible VSATs, or locations and load balancing for user spot beams. If a VSAT, such as the VSAT 102, is being installed at a particular fixed location, the VSAT 102 may need to determine for itself which available user spot beam to use. FIG. 8 depicts an exemplary procedure for performing user spot beam selection in a multibeam satellite communications system. In block 801, the VSAT 102 may calculate the normalized distance metric $D_i$ for available user spot beams. The VSAT 102 may have a table of user spot beam centers in, for example, az/el coordinates and radii for each user spot beam from the satellite 103. The VSAT 102 may also know, or be able to calculate from its GPS position, the location of the VSAT 102 in, for example, az/el coordinates. The VSAT 102 may then use the table of user spot beam centers and radii and the VSAT 102's own location in conjunction with equation (1), and, if the user spot beams are not circular, equations (2) and (3), to calculate $D_i$ for the user spot beams from the satellite 103. If the VSAT 102 is also within the user spot beam of an additional satellite, the VSAT 102 may calculate $D_i$ for those user spot beams as well. For example, VSAT 102 as depicted in FIG. 2 may calculate $D_i$ for the user spot beams 105, 201, and 202.

In block 802, the VSAT 102 may filter the list of user spot beams to include only those user spot beams with a $D_i$ of less than one. If the VSAT 102 calculates the $D_i$ of a user spot beam as greater than one, that may indicate that the VSAT 102 is located outside of the coverage area of that user spot beam, and therefore cannot use that user spot beam to connect to the satellite 103. For some variations on equation (1), the threshold for the filtering of the list may be number of different than one, and may vary depending on how is being $D_i$ calculated.

In block 803, the VSAT 102 may select the user spot beam with the lowest $D_i$ and the correct polarizer settings. The user spot beam with the smallest $D_i$ may provide the better performance than the user spot beams with larger $D_i$'s, or may be weighted more highly by the operator of the satellite communication's system. A polarizer in the VSAT 102 may be set by, for example, a person installing the VSAT 102, based on an estimate of which of the user spot beams the VSAT 102 will use. The installer may need to indicate to the Indoor Unit (IDU) component of the VSAT 102 which polarizer setting was chosen during the setup polarizer. For example, if VSAT 102 determined the smallest $D_i$ for the user spot beam 105, and the user spot beam 105 has the correct polarizer settings, the VSAT 102 may select the user spot beam 105.

In block 804, the VSAT 102 may check for an outroute in the select user spot beam. The outroute may be a connection to the satellite 103 carried on the user spot beam. For example, if the VSAT 102 selected the user spot beam 105 in block 803, the VSAT 102 may attempt to connect to the satellite 103 through the user spot beam 105.

In block 805, the VSAT 102 may determine if an outroute was found. If the VSAT 102 was able to find an outroute in the selected user spot beam, for example, the VSAT 102 was able to connect to the satellite 103 through the user spot beam 105, flow proceeds to block 806. Otherwise, if no outroute is found, for example, the VSAT 102 is unable to establish a connection with the satellite 103 through the user spot beam 105, flow proceeds to block 809.

In block 806, the VSAT 102 may determine that the selected user spot beam is the wrong beam. Once the VSAT 102 has found an outroute, the VSAT 102 may connect with the satellite 103. The satellite 103 may indicate to the VSAT 102 that the VSAT 102 is on the wrong user spot beam. For example, the VSAT 102 may select the user spot beam 105, and then attempt to find an outroute on which to connect to the satellite 103. The VSAT 102 may find an outroute and connect to the satellite 103, but the satellite 103 may indicate that the VSAT 102 may not use the outroute on the user spot beam 105, and is therefore on the wrong user spot beam. If the VSAT 102 is on the wrong user spot beam, flow proceeds to block 808. Otherwise, flow proceeds to block 807.

In block 807, the VSAT 102 has finished selecting and connecting to a user spot beam. Once the VSAT 102 has selected a user spot beam, found an outroute on the selected user spot beam, connected to the satellite 103 on the outroute, and confirmed that the outroute is on the selected user spot beam, the VSAT 102 may be connected to the satellite communications system. The VSAT 102 may then provide access to, for example, the Internet 107, to the remote host 106.

In block 808, the VSAT 102 may be redirected to the proper user spot beam, and may also reverse the VSAT 102's polarization. If the VSAT 102 found an outroute, but was told by the satellite 103 that the outroute was on the wrong user spot beam, the satellite 103 may redirect the VSAT 102 to the proper user spot beam. The VSAT 102 may also need to reverse polarization, if the proper use spot beam uses the reverse polarization from the VSAT 102's current polarization. Flow may then proceed back to block 904, where the VSAT 102 may attempt to find and connect to an outroute in the user spot beam to which the VSAT 102 was redirected.

In block 809, the VSAT 102 could not find an outroute, and may determine if the VSAT 102 has previously been redirected to a different user spot beam by the satellite 103. If the VSAT 102 has previously been redirected, for example, the satellite 103 told the VSAT 102 that the VSAT 102 was one the wrong beam in block 806 and the VSAT 102 was redirected to the proper user spot beam in block 808, flow proceeds to block 814. If the VSAT 102 has not been previously redirected, for example, the VSAT 102 was unable to find an outroute in the selected user spot beam from block 803, flow proceeds to block 810.

In block 810, the VSAT 102 may determine if the VSAT 102 has attempted to find an outroute on all user spot beams with a $D_i$ less than or equal to one. If the VSAT 102 has not tried to find an outroute on all user spot beams with a $D_i$ less than or equal to one, for example, there are still untried user spot beams on the filtered list from block 802, flow proceeds to block 811. Otherwise flow proceeds to block 814.

In block 811, the VSAT 102 may determine if the VSAT 102 has attempted to find an outroute on all user spot beams with a $D_i$ less than or equal to one and with the same polarization as the current polarization of the VSAT 102. If the VSAT 102 has not tried to find an outroute on all user spot beams with a $D_i$ less than or equal to one and the same polarization as the VSAT 102, for example, there are still untried user spot beams on the filtered list from block 802 that also have the same polarization as the VSAT 102, flow proceeds to block 813. Otherwise flow proceeds to block 812.

In block 812, the VSAT 102 may reverse its own polarization. The VSAT 102 may have already tried to find an outroute on all of the user spot beams with a with a $D_i$ less than or equal to one and the same polarization as the VSAT 102. The remaining untried user spot beams with a with a $D_i$ less than or equal to one may have a polarization opposite of the current polarization of the VSAT 102. The VSAT 102 may reverse its own polarization, so that the VSAT 102 can attempt to find an outroute on the untried user spot beams.

In block 813, the VSAT 102 may select the next untried use spot beam with a $D_i$ less than or equal to one. The next untried user spot beam may have the same polarization as the VSAT 102, because either the VSAT 102 determined in block 811 that not all of the user spot beams with the same polarization as the VSAT 102 had been tried, or the VSAT 102 reversed its own polarization in the block 812 in order to try the untried user spot beams that had a polarization opposite the polarization the VSAT 102 had been using before block 812. The untried user spot beam selected may be the untried user spot beam with the lowest $D_i$ of all of the untried user spot beams. Flow may proceed back to block 804, where the VSAT 102 may attempt to find an outroute on the selected user spot beam.

In block 814, the VSAT 102 may report that an outroute cannot be found. The VSAT 102 may have found an outroute, been redirected by the satellite 103 to the proper user spot beam in block 808, and been unable to find to find an outroute on the proper user spot beam, or the VSAT 102 may have tried to find an outroute on every user spot beam with a $D_i$ less than or equal to one in both polarizations, and been unable to find an outroute. The VSAT 102 may issue a report or error message to, for example, a person installing the VSAT 102, indicating that the VSAT 102 was unable to find an outroute and further troubleshooting steps may be needed.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention.

Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. An apparatus for beam selection for a multibeam satellite communications system comprising:
   a very small aperture terminal (VSAT) comprising a remote satellite dish configured to send and receive RF signals; and
   a processor configured to calculate a normalized distance metric for a plurality of user spot beams, select a user spot beam with the lowest normalized distance metric, and find an outroute on the selected user spot beam using the remote satellite dish.

2. The apparatus of claim 1, wherein the processor is further configured to create a list of user spot beams comprising the user spot beams with normalized distance metrics that are less than a threshold value.

3. The apparatus of claim 2, wherein the processor is further configured to determine that an outroute was not found with the selected user spot beam, select the user spot beam with the next lowest normalized distance metric from the list of user spot beams, and find an outroute with the selected user spot beam with the next lowest normalized distance metric.

4. The apparatus of claim 1, wherein the VSAT further comprises a polarizer, and wherein the processor is further configured to select the user spot beam with a polarization that is the same as a polarization of the polarizer.

5. The apparatus of claim 1, wherein the normalized distance metric is calculated according to the equation:

$$D_i = \left( \frac{\sqrt{(x-x_i)^2 + (y-y_i)^2}}{R_i} \right)^{W_i}$$

where $D_i$ is the normalized distance metric, (x, y) is location of the VSAT in horizontal one of (az/el) and U/V coordinates, $(x_i, y_i)$ is the location of the center of the user spot beam in one of az/el or U/V coordinates, $R_i$ is the radius of the user spot beam, and $W_i$ is the weight given to the user spot beam.

6. The apparatus of claim 5, wherein the radius $R_i$ is calculated according to the equation:

$$R_i = \sqrt{\left( \begin{array}{c} (R_{1i} * \cos(\theta_i - a_i) * \cos(a_i) - R_{2i} * \sin(\theta_i - a_i) * \sin(a_i)^2 + \\ (R_{2i} * \sin(\theta_i - a_i) * \cos(a_i) + R_{1i} * \cos(\theta_i - a_i) * \cos(a_i)) \end{array} \right)^2}$$

where $R_{1i}$ is the semi-major axis of the user spot beam, $R_{2i}$ is the semi-minor axis of the user spot beam, $a_i$ is the tilt angle of the user spot beam, and is calculated according to the equation:

$$\theta_i = \arctan((y-y_{01})/(x-x_{01}))$$

where $(x_{01}, y_{01})$ is the location of the centroid of the user spot beam.

7. The apparatus of claim 2, wherein the threshold value is one.

8. The apparatus of claim 5, wherein the radius $R_i$ is calculated according to the equation:

$$R_i = F_i(x_{01}, y_{01})$$

where $F_i$ is a function particular to the user spot beam and known to the VSAT.

9. The apparatus of claim 1, wherein the plurality of user spot beams originates from more than one satellite.

10. A method for beam selection for a multibeam satellite communications system comprising:
    calculating a normalized distance metric for a plurality of user spot beams;
    selecting a user spot beam with the lowest normalized distance metric; and
    finding an outroute on the selected user spot beam using a very small aperture terminal (VSAT).

11. The method of claim 10, wherein selecting the user spot beam further comprises selecting the user spot beam with a current polarity of the VSAT.

12. The method of claim 10, further comprising:
    determining an outroute was not found on the selected user spot beam.

13. The method of claim 12, further comprising:
    determining that the VSAT has already been redirected to a different user spot beam; and
    outputting an indicator that the outroute cannot be found.

14. The method of claim 10, further comprising:
    determining that the VSAT has not been redirected to a different user spot beam.

15. The method of claim 14, further comprising:
determining that there is another user spot beam with a normalized distance metric less than a threshold value.

16. The method of claim 15, further comprising:
determining that the another user spot beam has the same polarity as the VSAT; and
finding an outroute on the another user spot beam.

17. The method of claim 15, further comprising:
determining that the another user spot beam has an opposite polarity from the VSAT;
reversing the polarity of the VSAT; and
finding an outroute on the another user spot beam.

18. The method of claim 10, further comprising:
receiving an indication that the outroute that has been found is on a wrong user spot beam; and
receiving instructions redirecting the VSAT to a correct user spot beam.

19. The method of claim 10, wherein the normalized distance metric is calculated according to the equation:

$$D_i = \left( \frac{\sqrt{(x-x_i)^2 + (y-y_i)^2}}{R_i} \right)^{W_i}$$

where $D_i$ is the normalized distance metric, (x, y) is location of the VSAT in horizontal one of (az/el) and U/V coordinates, $(x_i, y_i)$ is the location of the center of the user spot beam in one of az/el or U/V coordinates, $R_i$ is the radius of the user spot beam, and $W_i$ is the weight given to the user spot beam.

20. The method of claim 10, wherein the radius $R_i$ is calculated according to the equation:

$$R_i = \sqrt{\left( \begin{array}{c} (R_{1i}*\cos(\theta_i - a_i)*\cos(a_i) - R_{2i}*\sin(\theta_i - a_i)*\sin(a_i))^2 + \\ (R_{2i}*\sin(\theta_i - a_i)*\cos(a_i) + R_{1i}*\cos(\theta_i - a_i)*\cos(a_i)) \end{array} \right)^2}$$

where $R_{1i}$ is the semi-major axis of the user spot beam, $R_{2i}$ is the semi-minor axis of the user spot beam, $a_i$ is the tilt angle of the user spot beam, and is calculated according to the equation:

$$\theta_i = \arctan((y-y_{01})/(x-x_{01}))$$

where $(x_{01}, y_{01})$ is the location of the centroid of the user spot beam.

21. The method of claim 10, wherein the radius $R_i$ is calculated according to the equation:

$$R_i = F_i(x_{01}, y_{01})$$

where $F_i$ is a function particular to the user spot beam and known to the VSAT.

22. The method of claim 10, wherein the plurality of user spot beams originates from more than one satellite.

23. A method for beam selection for a multibeam satellite communications system using a very small aperture terminal (VSAT) comprising:

(1) calculating a normalized distance metric for each user spot beam on a list of user spot beams;
(2) filtering the list of user spot beams to include only the user spot beams with a normalized distance metric less than a threshold value;
(3) selecting a user spot beam from the filtered list of user spot beams with the lowest normalized distance metric and a polarizer setting that matches the current polarizer setting of the VSAT; and
(4) checking for an outroute on the selected user spot beam; if an outroute is found,
(5) receiving an indication of whether the outroute is on the selected user spot beam;
if the outroute is on the selected user spot beam,
(6) establishing connectivity through the outroute on the selected user spot beam;
if the outroute is not on the selected user spot beam,
(7) receiving redirection to the selected user spot beam and if the selected user spot beam has a different polarization than the VSAT, reversing the polarization of the VSAT, otherwise not swapping the current polarization of the VSAT;
returning to step (4);
if an outroute is not found,
(8) determining if the VSAT has previously been redirected in step (7);
if the VSAT has previously been redirected,
(9) reporting that an outroute cannot be found;
if the VSAT has not previously been redirected,
(10) determining if there are any user spot beams on the filtered list of user spot beams that have not been checked for an outroute;
if there are user spot beams on the filtered list of user spot beams that have not been checked for an outroute,
(11) determining if there are user spot beams on the filtered list of user spot beams that have not been checked for an outroute and have the same polarization as the current polarization of the VSAT;
if there are user spot beams on the filtered list of user spot beams that have not been checked for an outroute and have the same polarization as the current polarization of the VSAT,
(12) selecting a user spot beam that has not been checked for an outroute with the lowest normalized distance metric and the same polarization as the current polarization of the VSAT from the filtered list;
(13) returning to step (4);
if there are no user spot beams on the filtered list of user spot beams that have not been checked for an outroute and have the same polarization as the current polarization of the VSAT;
(14) reversing the polarization of the VSAT; and
(15) returning to step (12);
if there are no user spot beams on the filtered list of user spot beams that have not been checked for an outroute,
(16) returning to step (9).

24. The method of claim 23, wherein the plurality of user spot beams originates from more than one satellite.

* * * * *